Patented Jan. 15, 1924.

1,480,896

UNITED STATES PATENT OFFICE.

WHEELER P. DAVEY, OF SCHENECTADY, NEW YORK, ASSIGNOR TO GENERAL ELECTRIC COMPANY, A CORPORATION OF NEW YORK.

FLUORESCENT SCREEN.

No Drawing.   Application filed May 2, 1921.   Serial No. 466,278.

*To all whom it may concern:*

Be it known that I, WHEELER P. DAVEY, a citizen of the United States, residing at Schenectady, in the county of Schenectady, State of New York, have invented certain new and useful Improvements in Fluorescent Screens, of which the following is a specification.

The present invention comprises an improved fluorescent screen, that is, a sheet material sensitive to radiations, such as X-rays or ultra-violet light.

Difficulty has been experienced heretofore in the manufacture of fluorescent screens which could be subjected to ordinary usage without damage. One source of trouble has been the elimination of fluid substances which had been added to produce a mass capable of being poured. Rapid evaporation of such fluid solvents caused roughness of surface rendering the film subject to soiling and scratching by ordinary handling. The unavoidably rough surface of such a screen made washing of a soiled surface impracticable. Slow evaporation of solvents produced a smoother surface, but required constant supervision to insure a uniform screen, and the time required was so great as to make the process expensive.

Another source of trouble in screens made by the pouring method are the voids left in the body of the screen by the elimination of the solvent. Except when these voids are covered by a water-proofing material, such screens cannot be washed without the deleterious absorption of moisture. Porous screens also are liable to damage by accidental contact with chemicals in the dark room.

I have discovered that fluorescent screens can be made which give superior results as intensifying screens and have superior mechanical strength and are free from voids by either eliminating the solvent entirely or reducing it to such a low proportion that the mixture of fluorescent material and binder is too stiff to pour at room temperature. I have found that a proportion of binder of celluloid or the like as low as 20%, or even lower, is sufficient to produce screens having the described properties altho proportions as low as this are not in use in manufacture of ordinary articles from celluloid.

For the purpose of carrying out my invention, suitable fluorescent material is thoroughly mixed by any suitable method with celluloid, or other cellulose compound, to produce a mass which is non-fluid at room temperature. Instead of the usual pouring process the mixture is shaped by mechanical methods into sheet form. For example, about 80 to 90 parts of finely divided inorganic fluorescent material such, for example, as calcium tungstate are incorporated with 20 to 10 parts of pyroxylin by weight with or without the addition of camphor. If desired a very small amount of a suitable solvent may be added to assist mixing, but the completed mixture should not be so fluid or thin as to flow at room temperature. The resulting material is mechanically shaped by the usual methods of celluloid manufacture into sheets of desired thickness, for example, by cutting from a cake, rolling into sheet form at the softening temperature or by a combination of these two methods.

Screens produced by this method are so free from voids that they may be immersed in water without substantial increase in weight. The surface of my new screens is smooth and has a hardness of about one on the mineral scale, that is, it cannot be readily scratched with the finger nail.

I desire by the appended claims to cover various binding materials, other than pyroxylin or celluloid, for example, cellulose acetate, cellulose formate, casein, or the like.

What I claim as new and desire to secure by Letters Patent of the United States, is:—

1. A fluorescent screen comprising a mixture of finely divided mineral fluorescent material and pyroxylin in coherent sheet form having a smooth surface, the fluorescent material being largely in excess by weight, said screen having a hardness of about 1 on the mineral scale and a freedom from voids rendering the same capable of immersion in water without substantial increase in weight by absorption of water.

2. The process of making fluorescent screens which consists in mixing a finely divided fluorescent material with pyroxylin, the former material being in excess by weight adding sufficient solvent to bring the mixture to a plastic consistency too stiff to pour and shaping the same mechanically to sheet form.

3. The process of making fluorescent screens which consists in mixing by weight about 80 parts of finely divided calcium tungstate and about 20 parts of pyroxylin and mechanically shaping the mass to sheet form.

4. The process of making fluorescent screens which consists in forming a cake of a mixture of finely divided fluorescent material and a lesser quantity of pyroxylin, and cutting said cake into sheet form.

5. Fluorescent sheet material comprising a mixture of about 80 to 90 parts by weight of fluorescent material and about 20 to 10 parts of an organic binder, said material having a smooth surface, a hardness of about 1 on the mineral scale and being sufficiently dense to substantially resist the absorption of water when immersed therein.

In witness whereof, I have hereunto set my hand this 30 day of April, 1921.

WHEELER P. DAVEY.